United States Patent
Pin et al.

(10) Patent No.: US 11,713,283 B2
(45) Date of Patent: Aug. 1, 2023

(54) PART COMPRISING A SUBSTRATE AND AN ENVIRONMENTAL BARRIER

(71) Applicants: SAFRAN CERAMICS, Le Haillan (FR); CENTRE NATIONAL DE LA RECHERCHE SCIENTIFIQUE (CNRS), Paris (FR); UNIVERSITE DE BORDEAUX, Bordeaux (FR)

(72) Inventors: Lisa Pin, Moissy-Cramayel (FR); Simon Arnal, Bordeaux (FR); Francis Rebillat, Pessac (FR); Fabrice Mauvy, Canejan (FR)

(73) Assignees: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 770 days.

(21) Appl. No.: 16/475,903

(22) PCT Filed: Jan. 4, 2018

(86) PCT No.: PCT/FR2018/050019
§ 371 (c)(1),
(2) Date: Jul. 3, 2019

(87) PCT Pub. No.: WO2018/127664
PCT Pub. Date: Jul. 12, 2018

(65) Prior Publication Data
US 2019/0330121 A1    Oct. 31, 2019

(30) Foreign Application Priority Data
Jan. 6, 2017    (FR) ...................................... 1750126

(51) Int. Cl.
C04B 41/87    (2006.01)
C04B 41/50    (2006.01)
(Continued)

(52) U.S. Cl.
CPC .......... *C04B 41/87* (2013.01); *C04B 41/0009* (2013.01); *C04B 41/5024* (2013.01);
(Continued)

(58) Field of Classification Search
CPC ................................................ C04B 41/5024
See application file for complete search history.

(56) References Cited

U.S. PATENT DOCUMENTS

2003/0203215 A1    10/2003    Shimatani et al.
2004/0023125 A1    2/2004    Nozawa et al.
(Continued)

FOREIGN PATENT DOCUMENTS

CN    1670337 A    9/2005
CN    101768380 A    7/2010
(Continued)

OTHER PUBLICATIONS

International Search Report as issued in International Patent Application No. PCT/FR2018/050019, dated Apr. 17, 2018.
(Continued)

*Primary Examiner* — David Sample
(74) *Attorney, Agent, or Firm* — Pillsbury Winthrop Shaw Pittman LLP

(57) ABSTRACT

A part includes a substrate, having, adjacent to a surface of the substrate, at least a portion that is made from a material that contains silicon, and an environmental barrier formed on the surface of the substrate, the environmental barrier including at least a first layer including a rare earth disilicate of formula $RE^a{}_2Si_2O_7$ present at a molar content lying in the range 70% to 99.9%, where $RE^a$ is a rare earth element; and
(Continued)

at least one rare earth oxide of formula $RE^b_2O_3$ present at a molar content lying in the range 0.1% to 30%, where $RE^b$ is a rare earth element different from $RE^a$.

14 Claims, 2 Drawing Sheets

(51) Int. Cl.
  *C04B 41/89*     (2006.01)
  *F01D 5/28*     (2006.01)
  *C04B 41/00*     (2006.01)

(52) U.S. Cl.
  CPC .............. *C04B 41/89* (2013.01); *F01D 5/284* (2013.01); *F01D 5/288* (2013.01)

(56) References Cited

U.S. PATENT DOCUMENTS

| | | | |
|---|---|---|---|
| 2004/0175597 A1 | 9/2004 | Litton et al. | |
| 2007/0056961 A1 | 3/2007 | Shimatani et al. | |
| 2009/0162632 A1* | 6/2009 | Kirby | C04B 41/5024 428/448 |
| 2009/0178413 A1* | 7/2009 | Lee | C23C 28/042 428/448 |
| 2009/0220776 A1* | 9/2009 | Meschter | C23C 28/3455 156/60 |
| 2011/0027557 A1* | 2/2011 | Kirby | C04B 41/52 428/428 |
| 2011/0256411 A1 | 10/2011 | Courcot et al. | |
| 2012/0244383 A1 | 9/2012 | Meschter et al. | |
| 2012/0302438 A1 | 11/2012 | Ohtake et al. | |
| 2014/0261080 A1* | 9/2014 | Lee | C23C 14/30 427/596 |
| 2015/0079371 A1 | 3/2015 | Nakada et al. | |
| 2015/0267058 A1* | 9/2015 | Lee | C09D 1/00 428/335 |
| 2016/0003063 A1 | 1/2016 | Rosenzweig et al. | |
| 2016/0024962 A1 | 1/2016 | Luthra | |
| 2016/0153288 A1* | 6/2016 | Luth | C04B 41/009 156/60 |
| 2016/0160664 A1 | 6/2016 | Luthra et al. | |
| 2017/0073277 A1* | 3/2017 | Shim | F01D 5/288 |

FOREIGN PATENT DOCUMENTS

| | | | | |
|---|---|---|---|---|
| CN | 102689461 A | 9/2012 | | |
| CN | 104908396 A | 9/2015 | | |
| CN | 105026339 A | 11/2015 | | |
| CN | 105189932 A | 12/2015 | | |
| RU | 2006143777 A | 6/2008 | | |
| RU | 2519250 C2 | 6/2014 | | |
| RU | 2569367 C2 | 11/2015 | | |
| RU | 2579592 C1 | 4/2016 | | |
| WO | WO 2014/150380 A1 | 9/2014 | | |
| WO | WO-2014150380 A1 * | 9/2014 | ............ | F01D 5/284 |
| WO | WO 2016/003571 A1 | 1/2016 | | |

OTHER PUBLICATIONS

Office Action and Search Report as issued in Brazilian Patent Application No. BR112019013928, dated Apr. 19, 2022.

* cited by examiner

PART COMPRISING A SUBSTRATE AND AN ENVIRONMENTAL BARRIER

CROSS-REFERENCE TO RELATED APPLICATIONS

This application is the U.S. National Stage of PCT/FR2018/050019, filed Jan. 4, 2018, which in turn claims priority to French patent application number 1750126 filed Jan. 6, 2017. The content of these applications are incorporated herein by reference in their entireties.

BACKGROUND OF THE INVENTION

The invention relates to protecting a substrate in which at least a portion adjacent to a surface of the substrate is made of a material containing silicon, and while the substrate is in use at high temperature in an oxidizing medium, by forming an environmental barrier on the surface of the substrate.

A particular field of application is that of protecting parts made of ceramic matrix composite (CMC) material that form hot parts in gas turbines, such as combustion chamber walls, or turbine rings, turbine nozzles, or turbine blades or vanes, for aeroengines or for industrial turbines.

For such gas turbines, the need to improve efficiency and reduce polluting emissions leads to envisaging the use of ever higher temperatures in the combustion chambers.

Proposals have therefore been made to replace metal materials by CMC materials, in particular for the walls of combustion chambers or for turbine rings. Specifically, CMC materials are known to possess both good mechanical properties enabling them to be used for structural elements, and also the ability to retain those properties at high temperatures. CMC materials comprise fiber reinforcement made of refractory fibers, typically carbon fibers or ceramic fibers, which reinforcement is densified by a ceramic matrix, e.g. made of SiC.

In the operating conditions of aviation turbines, i.e. at high temperature in an atmosphere that is oxidizing and wet, CMC materials are sensitive to a phenomenon of corrosion. The corrosion of the CMC is the result of SiC oxidizing to silica, which, in the presence of water vapor, evaporates in the form of silicon hydroxide $Si(OH)_4$. The corrosion phenomena lead to the CMC recession, thereby affecting its lifetime. In order to limit such degradation in operation, proposals have been made to form environmental barrier coatings on the surfaces of CMC materials. Such coatings may comprise a bonding layer of silicon together with a rare earth silicate layer positioned on the bonding layer. The bonding layer serves firstly to improve the adhesion of the rare earth silicate layer, and secondly to form a protective layer of silica of low permeability to oxygen that contributes to protecting the CMC against oxidation. The rare earth silicate layer serves to limit the diffusion of water vapor to the silica layer that is formed by oxidizing silicon, and consequently to limit recession thereof. Nevertheless, the rare earth silicate layer can itself be sensitive to the phenomenon of recession and can evaporate in operation, thereby negatively affecting the lifetime of the coated substrate. Also, it is desirable to improve the barrier effect against oxidizing species conferred by the environmental barrier coating.

There thus exists a need to have novel environmental barriers that impart an improved lifetime to the underlying material in operation.

OBJECT AND SUMMARY OF THE INVENTION

To this end, in a first aspect, the invention provides a part comprising a substrate, having, adjacent to a surface of the substrate, at least a portion that is made from a material that contains silicon, and an environmental barrier formed on the surface of the substrate, the environmental barrier comprising at least a first layer comprising:

a rare earth disilicate of formula $RE^a{}_2Si_2O_7$ present at a molar content lying in the range 70% to 99.9%, where $RE^a$ is a rare earth element; and at least one rare earth oxide of formula $RE^b{}_2O_3$ present at a molar content lying in the range 0.1% to 30%, where $RE^b$ is a rare earth element different from $RE^a$.

The presence of the rare earth oxide $RE^b{}_2O_3$ in the first layer in particular proportions serves advantageously to confer on the environmental barrier a better barrier effect against diffusion of oxidizing species and also improved ability to withstand recession. The fact that the oxide $RE^b{}_2O_3$ is present in the first layer at a content of at least 0.1% in molar percentage serves advantageously to improve the barrier effect against oxidizing species and the ability to withstand recession. The barrier effect against oxidizing species may nevertheless be negatively affected if the molar content of oxide $RE^b{}_2O_3$ in the first layer is too high, which is why this content of $RE^b{}_2O_3$ is limited to at most 30% in molar percentage. It should also be observed that the presence of the rare earth oxide $RE^b{}_2O_3$ in the specified proportions serves to give the first layer improved ability to withstand calcium and magnesium aluminosilicates (CMASes). Specifically, the rare earth oxide $RE^b{}_2O_3$ presents greater reactivity with CMASes in comparison with the rare earth silicate and therefore reacts preferentially therewith so as to form compounds that are thermochemically stable, thereby preventing CMASes from migrating further towards the substrate. The invention thus provides an environmental barrier that imparts to the underlying substrate a lifetime that is improved at high temperature and in an environment that is oxidizing and wet.

In an embodiment, $RE^b$ is selected from terbium Tb, erbium Er, dysprosium Dy, gadolinium Gd, europium Eu, lutetium Lu, samarium Sm, yttrium Y, and ytterbium Yb. In particular, $RE^b$ is selected from terbium Tb, erbium Er, and dysprosium Dy. When $RE^b$ is yttrium Y, $RE^a$ may be ytterbium Yb. When $RE^b$ is ytterbium Yb, $RE^a$ may be yttrium Y.

In an embodiment, the rare earth disilicate of formula $RE^a{}_2Si_2O_7$ is present in the first layer at a molar content lying in the range 80% to 95%, and said at least one rare earth oxide of formula $RE^b{}_2O_3$ is present in the first layer at a molar content lying in the range 5% to 20%.

In an embodiment, the rare earth disilicate of formula $RE^a{}_2Si_2O_7$ is present in the first layer at a molar content lying in the range 85% to 95%, and said at least one rare earth oxide of formula $RE^b{}_2O_3$ is present in the first layer at a molar content lying in the range 5% to 15%.

In an embodiment, $RE^a$ is selected from yttrium Y and ytterbium Yb.

In an embodiment, the environmental barrier further comprises a second layer present on the first layer, the second layer comprising at least one rare earth monosilicate of formula $RE^c{}_2SiO_5$, where $RE^c$ is a rare earth element.

The presence of the second layer based on the monosilicate $RE^c{}_2SiO_5$ serves advantageously to still further improve the ability of the environmental barrier to withstand recession, insofar as rare earth monosilicates are less sensitive to this phenomenon than are rare earth disilicates.

In an embodiment, the second layer comprises at least:
the rare earth monosilicate of formula $RE^c{}_2SiO_5$ at a molar content lying in the range 85% to 99.9%; and at least one rare earth oxide of formula $RE^d_2O_3$ present at a molar content lying in the range 0.1% to 15%, where $RE^d$ is a rare earth element different from $RE^c$.

As described above for the first layer, adding the rare earth oxide $RE^d_2O_3$ in the second layer serves to give it improved ability to withstand recession and an improved barrier effect against oxidizing species. As with the first layer, the presence of the rare earth oxide $RE^d_2O_3$ serves to give the second layer improved ability to withstanding calcium and magnesium aluminosilicates (CMASes).

In an embodiment, $RE^d$ is selected from terbium Tb, erbium Er, dysprosium Dy, gadolinium Gd, europium Eu, lutetium Lu, samarium Sm, yttrium Y, and ytterbium Yb. In particular, $RE^d$ is selected from terbium Tb, erbium Er, and dysprosium Dy. When $RE^d$ is yttrium Y, $RE^c$ may ytterbium Yb. When $RE^d$ is ytterbium Yb, $RE^c$ may be yttrium Y.

In an embodiment, the rare earth monosilicate of formula $RE^c_2SiO_5$ is present in the second layer at a molar content lying in the range 85% to 95%, and said at least one rare earth oxide of formula $RE^d_2O_3$ is present in the second layer at a molar content lying in the range 5% to 15%.

In an embodiment, $RE^c$ is selected from yttrium Y and ytterbium Yb.

In an embodiment, $RE^a$ is yttrium Y, $RE^c$ is ytterbium Yb, and $RE^b$ and $RE^d$ are independent of each other, and selected from terbium Tb, erbium Er, and dysprosium Dy.

In an embodiment, the environmental barrier further comprises a third layer present between the first layer and the second layer, the third layer comprising:

the rare earth disilicate of formula $RE^a_2Si_2O_7$ at a molar content equal to $A \cdot Ta$, where Ta is the molar content of $RE^a_2Si_2O_7$ in the first layer;

said at least one rare earth oxide of formula $RE^b_2O_3$ at a molar content equal to $A \cdot Tb$, where Tb is the molar content of $RE^b_2O_3$ in the first layer; and the rare earth monosilicate of formula $RE^c_2SiO_5$ at a molar content equal to $(1-A) \cdot Tc$, where Tc is the molar content of $RE^c_2SiO_5$ in the second layer;

where A designates a weighting coefficient that is strictly greater than 0 and strictly less than 1.

Such an embodiment applies when a third layer of mixed composition is interposed between the first layer and the second layer. This embodiment is advantageous for still further improving compatibility between the first layer and the second layer in terms of coefficient of thermal expansion.

By way of example, A may lie in the range 0.25 to 0.75. The third layer may also comprise said at least one rare earth oxide of formula $RE^d_2O_3$ at a molar content equal to $(1-A) \cdot Td$, where Td is the molar content of $RE^d_2O_3$ in the second layer.

In an embodiment, the environmental barrier comprises, in addition to the third layer, a fourth layer present between the third layer and the second layer, the fourth layer comprising:

the rare earth disilicate of formula $RE^a_2Si_2O_7$ at a molar content equal to $B \cdot Ta$;

said at least one rare earth oxide of formula $RE^b_2O_3$ at a molar content equal to $B \cdot Tb$;

the rare earth monosilicate of formula $RE^c_2SiO_5$ at a molar content equal to $(1-B) \cdot Tc$; and optionally, said at least one rare earth oxide of formula $RE^d_2O_3$ at a molar content equal to $(1-B) \cdot Td$;

where B designates a weighting coefficient strictly greater than 0 and strictly less than 1, and the coefficient B is strictly less than the coefficient A.

Such an example serves advantageously to still further improve compatibility between the first layer and the second layer in terms of coefficient of thermal expansion.

In an embodiment, the environmental barrier further comprises an adhesion layer comprising silicon present between the first layer and the surface of the substrate.

The present invention also provides a method of fabricating a part as described above, the method comprising at least a step of forming the first layer of the environmental barrier on the surface of the substrate.

The method may also include a step of forming a second layer of the environmental barrier on the first layer.

The method may also include a step of forming a third layer of the environmental barrier on the first layer before forming the second layer. The method may also include a step of forming the fourth layer of the environmental barrier on the third layer prior to forming the second layer.

Prior to forming the first layer, the method may also include a step of forming an adhesion layer on the surface of the substrate. The present invention also provides a method of using a part as described above, the method comprising at least a step of using said part at a temperature higher than or equal to 800° C. in a medium that is oxidizing and wet.

BRIEF DESCRIPTION OF THE DRAWINGS

Other characteristics and advantages of the invention appear from the following description given by way of non-limiting example and with reference to the accompanying drawings, in which.

DETAILED DESCRIPTION OF EMBODIMENTS

In the following detailed description, an environmental barrier is to formed on a substrate made of CMC material containing silicon. Nevertheless, the invention is applicable to substrates of monolithic refractory material containing silicon, and more generally to substrates in which at least a portion adjacent to an outside surface of the substrate is made of a refractory material (composite or monolithic) that contains silicon. Thus, the invention seeks in particular to protect refractory materials constituted by monolithic ceramic, e.g. made of silicon carbide (SiC) or of silicon nitride ($Si_3N_4$), and more particularly it seeks to protect refractory materials such as ceramic matrix composite (CMC) composite materials containing silicon, e.g. CMC materials having a matrix made at least in part out of SiC.

Figure 1:
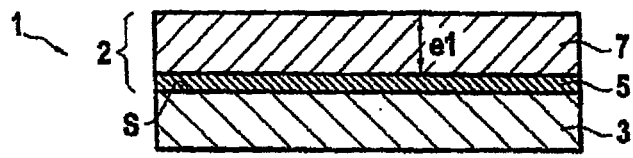
FIG. 1 is a diagram showing a part in a first embodiment of the invention.

FIG. 1 shows a part 1 made on a substrate 3 provided with an environmental barrier 2, in a first embodiment of the invention. The surface S of the substrate 3 is made of a refractory material containing silicon.

The substrate 3 made of CMC material containing silicon comprises fiber reinforcement, which may be made of carbon (C) fibers or of ceramic fibers, e.g. of SiC fibers or of fibers that are made essentially out of SiC, including Si—C—O or Si—C—O—N fibers, i.e. fibers also containing oxygen and possibly nitrogen. Such fibers are produced by the supplier Nippon Carbon under the reference "Nicalon" or "Hi-Nicalon" or "Hi-Nicalon Type-S", or by the supplier Ube Industries under the reference "Tyranno-ZMI". The ceramic fibers may be coated in a thin interphase layer made out of pyrolytic carbon (PyC), out of boron nitride (BN), or out of boron-doped carbon (BC), having 5 at % to 20 at % of B, the balance being C).

The fiber reinforcement is densified by a matrix that is formed, throughout the reinforcement or at least in an outer phase thereof, by a material containing silicon, such as a compound of silicon, e.g. SiC or a ternary Si—B—C system. The term "outer" phase of a matrix is used to mean a matrix phase that is formed last, being furthest away from the reinforcing fibers. Thus, the matrix may be made up of a plurality of phases of different kinds, and may for example comprise:

a mixed C—SiC matrix (with SiC being on the outside); or a sequenced matrix having alternating phases of SiC and matrix phases of lower stiffness, e.g. made out of pyrolytic carbon (PyC), out of boron nitride (BN), or out of boron-doped carbon (BC), with a terminal matrix phase made out of SiC; or a self-healing matrix with matrix phases made out of boron carbide ($B_4C$) or out of a ternary Si—B—C system, possibly including free carbon ($B_4C+C$, Si—B—C+C), and with a terminal phase made out of Si—B—C or out of SiC.

In known manner, the matrix may be formed at least in part by chemical vapor infiltration (CVI). In a variant, the matrix may be formed at least in part using a liquid technique (impregnation with a matrix-precursor resin and transformation by cross-linking and pyrolysis, which process may be repeated), or by infiltrating molten silicon (known as "melt-infiltration"). With melt-infiltration, a powder is introduced into the fiber reinforcement that might possibly already be partially densified, which powder may be a carbon powder and optionally a ceramic powder, and a metal composition based on silicon in the molten state is then infiltrated so as to form a matrix of the SiC—Si type.

The environmental barrier 2 is formed on the entire outside surface S of the substrate 3 or on only a portion of that surface S, e.g. when only a portion of the surface S needs to be protected. In the example shown in FIG. 1, the environmental barrier 2 comprises a first layer 7 and an adhesion layer 5 present between the substrate 3 and the first layer 7. In the example shown, the adhesion layer 5 is present in contact with the surface S of the substrate 3. In addition, in this example, the first layer 7 is in contact with the adhesion layer 5.

The first layer 7 may be in the form of a system constituted by 70% molar to at most 99.9% molar of a rare earth disilicate $RE^a_2Si_2O_7$ and 0.1% molar to at most 30% molar of at least one rare earth oxide $RE^b_2O_3$, where $RE^b$ designates a rare earth element different from the rare earth element $RE^a$. Said at least one oxide $RE^b_2O_3$ and the disilicate $RE^a_2Si_2O_7$ are present in the first layer 7. Said at least one oxide $RE^b_2O_3$ may be present as a dopant in the first layer 7.

As mentioned above, the particular composition of the first layer 7 gives it in particular reduced ionic conductivity, making it more difficult for oxidizing and corrosive reactive species to diffuse, and also imparting increased resistance to the recession phenomenon.

The first layer 7 may comprise a disilicate of formula $RE^a_2Si_2O_7$ that is present in the first layer 7 at a molar content lying in the range 70% to 99.9% and a single oxide $RE^b_2O_3$ present in the first layer 7 at a molar content lying in the range 0.1% to 30%. In a variant, the first layer 7 may comprise i) a rare earth disilicate of formula $RE^a_2Si_2O_7$ present in the first layer 7 at a molar content lying in the range 70% to 99.9%, and ii) a plurality of rare earth oxides, each comprising a different rare earth element and each having the formula $RE^b_2O_3$, the total molar content of oxides of formula $RE^b_2O_3$ in the first layer lying in the range 0.1% to 30%, and each $RE^b$ being different from $RE^a$.

The molar content of rare earth oxide(s) $RE^b_2O_3$ in the first layer 7 may lie in the range 5% to 20%. In certain embodiments, the first layer 7 may be in the form of a system constituted by 80% molar to at most 95% molar of the rare earth disilicate $RE^a_2Si_2O_7$ together with 5% molar to at most 20% molar of said at least one rare earth oxide $RE^b_2O_3$. In particular, in certain embodiments, the first layer 7 may be in the form of a system constituted by 87% molar to at most 93% molar of the rare earth disilicate $RE^a_2Si_2O_7$ together with 7% molar to at most 13% molar of said at least one rare earth oxide $RE^b_2O_3$.

In particular, and ignoring inevitable impurities, the first layer 7 may comprise solely the rare earth disilicate $RE^a_2Si_2O_7$ together with said at least one rare earth oxide $RE^b_2O_3$. In particular, the first layer 7 may have no aluminum, and in particular no alumina. The first layer 7 may in particular have no alkali metal or no alkaline earth metal.

$RE^a$ is a rare earth element selected from yttrium Y, scandium Sc, and the lanthanides. In particular, $RE^a$ is selected from yttrium Y and ytterbium Yb. $RE^b$ is a rare earth element selected from yttrium Y, scandium Sc, and the lanthanides, and $RE^b$ is different from $RE^a$. In particular, $RE^b$ is selected from terbium Tb, erbium Er, and dysprosium Dy.

By way of example, the thickness $e_1$ of the first layer 7 may lie in the range 50 micrometers (μm) to 1.5 millimeters (mm).

The adhesion layer 5 comprises silicon, and by way of example, it may be made out of silicon or out of mullite ($3Al_2O_3.2SiO_2$). In known manner, the adhesion layer 5 may form a protective layer that serves in operation to passivate silica (known as a "thermally grown oxide").

Figure 2:
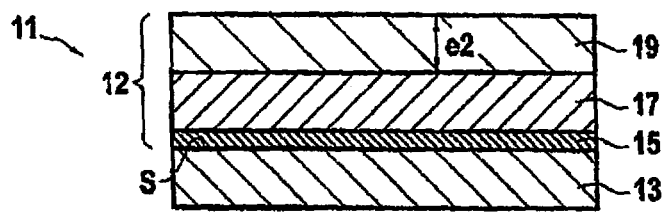
FIG. 2 is a diagram showing a part in a second embodiment of the invention.

With reference to FIG. 2, there is shown a part 11 in a second embodiment of the invention. In this example, the part 11 may comprise a substrate 13 having present on its surface S an environmental barrier 12. The substrate 13 may present the same characteristics as the substrate 3 described above. The environmental barrier 12 comprises an adhesion layer 15 that may present the same characteristics as the adhesion layer 5 described above, and a first layer 17 present on the adhesion layer 15, which first layer may present the same characteristics as the first layer 7 as described above.

In the example of FIG. 2, the environmental barrier 12 further comprises a second layer 19 that comprises at least one rare earth monosilicate $RE^c_2SiO_5$, where $RE^c$ designates a rare earth element.

As mentioned above, the presence of the second layer serves advantageously to still further improve the ability of the environmental barrier layer to withstand recession.

In particular, the second layer 19 may be in the form of a system constituted by 85% molar to at most 99.9% molar of the rare earth monosilicate $RE^c_2SiO_5$ together with 0.1% molar to at most 15% molar of at least one rare earth oxide $RE^d_2O_3$, where $RE^d$ designates a rare earth element different from the rare earth element $RE^c$. Said at least one oxide $RE^d_2O_3$ and the monosilicate $RE^c_2SiO_5$ are present in the second layer 19. Said at least one oxide $RE^d_2O_3$ may be present as a dopant in the second layer 19.

As mentioned above, such a second layer presents better ability to withstand recession and also presents a barrier effect that is improved against reactive species and CMASes.

The second layer 19 may comprise a monosilicate $RE^c_2SiO_5$ that is present in the second layer 19 at a molar content lying in the range 85% to 99.9% together with a single oxide $RE^d_2O_3$ that is present in the second layer 19 at a molar content lying in the range 0.1% to 15%. In a variant, the second layer 19 may comprise i) a rare earth monosilicate of formula $RE^c_2SiO_5$ that is present in the second layer 19 at a molar content lying in the range 85% to 99.9%, and ii) a plurality of rare earth oxides, each comprising a different rare earth element and each being of formula $RE^d_2O_3$, the total molar content of oxides of formula $RE^d_2O_3$ in the second layer lying in the range 0.1% to 15%, and each $RE^d$ being different from $RE^c$.

Said at least one rare earth oxide $RE^b_2O_3$ may be present in the first layer 17 at a first molar content and said at least one rare earth oxide $RE^d_2O_3$ may be present in the second layer 19 at a second molar content that may be less than the first molar content. Such a characteristic serves to still further improve compatibility between the first and second layers in terms of coefficients of thermal expansion. The molar content of rare earth oxide(s) $RE^d_2O_3$ in the second layer 19 may lie in the range 5% to 15%. In certain embodiments, the second layer 19 may be in the form of a system constituted by 85% molar to at most 95% molar of the rare earth monosilicate $RE^c_2SiO_5$, together with 5% molar to at most 15% molar of said at least one rare earth oxide $RE^d_2O_3$. In particular, in certain embodiments, the second layer 19 may be in the form of a system constituted by 87% molar to at most 93% molar of the rare earth monosilicate $RE^c_2SiO_5$ together with 7% molar to at most 13% molar of said at least one rare earth oxide $RE^d_2O_3$.

In particular, and ignoring inevitable impurities, the second layer 19 comprises solely the rare earth monosilicate $RE^c_2SiO_5$ and said at least one rare earth oxide $RE^d_2O_3$. In particular, the second layer 19 may have no aluminum, and in particular no alumina. The second layer 19 may in particular have no alkali metal or no alkaline earth metal.

$RE^c$ is a rare earth element selected from yttrium Y, scandium Sc, and the lanthanides. In particular, $RE^c$ is selected from yttrium Y and ytterbium Yb. $RE^d$ is a rare earth element selected from yttrium Y, scandium Sc, and the lanthanides, and $RE^d$ is different from $RE^c$. In particular, $RE^d$ is selected from terbium Tb, erbium Er, and dysprosium Dy. $RE^c$ may be identical to or different from $RE^a$. In particular, $RE^c$ is ytterbium Yb, and $RE^a$ is yttrium Y. $RE^d$ may be identical to or different from $RE^b$.

By way of example, the thickness $e_2$ of the second layer 19 may lie in the range 50 μm to 500 μm.

FIG. 2 shows an embodiment in which the second layer 19 comprising a rare earth monosilicate is present on the first layer 17 comprising the rare earth disilicate. In a variant, instead of the second layer 19, it is possible to place an additional layer on the first layer 17, this additional layer comprising a rare earth disilicate $RE^e_2Si_2O_7$ together with at least one rare earth oxide $RE^f_2O_3$ in the same ranges of molar contents as for the first layer, and in which $RE^f$ is a rare earth element different from the rare earth element $RE^e$. Under such circumstances, $RE^e$ may be identical to or different from $RE^a$. For example, it is possible to have $RE^e$=Yb and $RE^a$=Y. In addition, under such circumstances, $RE^f$ may be identical to or different from $RE^b$.

Furthermore, in the example of FIG. 2, the second layer 19 is in contact with the first layer 17. In a variant, a third layer and optionally a fourth layer, as described above, could be provided between the first layer 17 and the second layer 19.

Figure 3:
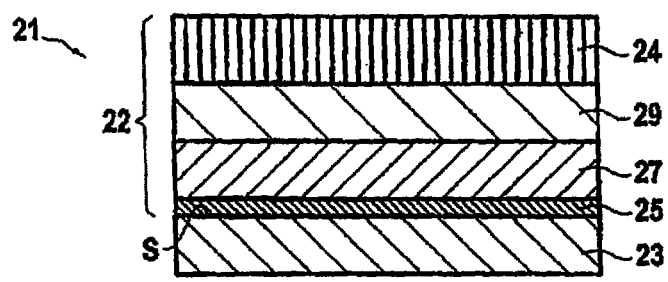
FIG. 3 is a diagram showing a part in a third embodiment of the invention.

In the embodiment of FIG. 3, the part 21 comprises a substrate 23, an adhesion layer 25, a first layer 27, and a second layer 29. The substrate 23, the adhesion layer 25, the first layer 27, and the second layer 29 may be as described above. The environmental barrier 22 further comprises a top layer 24 present on the second layer 29. In the example shown, this top layer 24 is a thermal barrier layer made of ceramic presenting a porous structure. The top layer 24 may be a rare earth silicate. In a variant, a top layer may be formed that is constituted by an abradable coating, e.g. when the CMC parts form turbine rings. The top layer could also constitute a protective coating against CMASes. Depositing the top layer 24 serves to provide the environmental barrier with additional functions. In a variant, it is possible to have a part without the top layer 24 and in which the first or second layer presents, in addition to a thermal barrier function, protection against CMASes, or constitutes an abradable coating.

Figure 4:
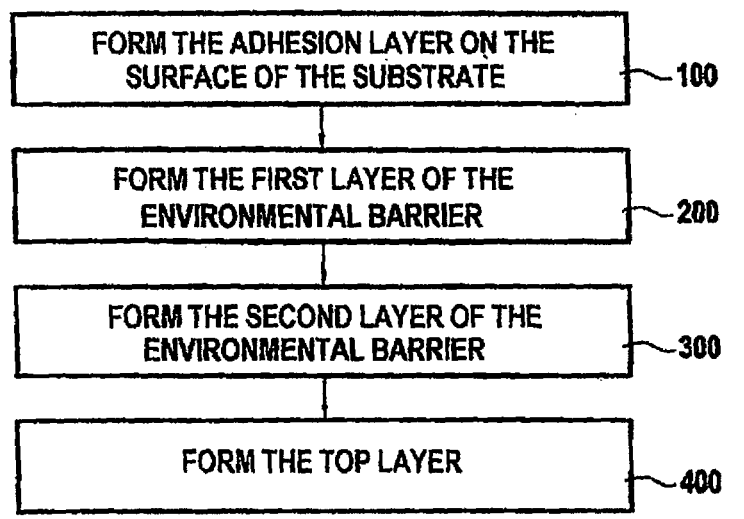
FIG. 4 is a flow chart showing the steps performed for fabricating the part shown in FIG. 3.

FIG. 4 shows the various steps performed in order to fabricate the part 21 shown in FIG. 3.

Initially, the adhesion layer 25 may be formed in known manner on the substrate 23 by thermal spraying using a powder or a mixture of powders having the desired composition (step 100).

The first layer 27 may be formed on the adhesion layer 25 by thermal spraying from a mixture of solid powders of $RE^a_2Si_2O_7$ and rare earth oxide(s) $RE^b_2O_3$ in the desired proportions (step 200). In similar manner, the second layer 29 may be formed on the first layer 27 by thermal spraying from a mixture of solid powders of $RE^c_2SiO_5$ and rare earth oxide(s) $RE^d_2O_3$ in the desired proportions (step 300). In a variant, the first and second layers 27 and 29 could be formed by other methods such as methods using a liquid technique, e.g. by dip-coating, spray-coating, electrophoresis, or by a sol-gel technique.

The top layer 24 of the thermal barrier may be formed, in conventional manner, by thermal spraying (step 400).

Once it has been made, the part can be used at a temperature that is higher than or equal to 800° C. in an atmosphere that is oxidizing and wet. In particular, it can be used at a temperature lying in the range 800° C. to 1500° C., or indeed in the range 800° C. to 1300° C. In particular, the part may be used in wet air.

The part made in this way may be a part for an aviation or aerospace application. The part may be a part for the hot portion of a gas turbine in an aeroengine or an aerospace engine or in an industrial turbine. The part may be a turbine engine part. The part may constitute at least a portion of a turbine nozzle, a portion of a propelling nozzle, or of a thermal protection coating, a wall of a combustion chamber, a turbine ring sector, or a turbine engine blade or vane.

EXAMPLE

Three examples of first layers of the invention have been fabricated. The three first layers that were fabricated had the following compositions:

yttrium disilicate at 95% molar and erbium oxide $Er_2O_3$ at 5% molar, this layer being written "DSY+5 at % $Er_2O_3$";

yttrium disilicate at 90% molar and erbium oxide $Er_2O_3$ at 10% molar, this layer being written "DSY+10 at % $Er_2O_3$"; and yttrium disilicate at 85% molar and erbium oxide $Er_2O_3$ at 15% molar, this layer being written "DSY+15 at % $Er_2O_3$".

A prior art environmental barrier layer constituted by yttrium disilicate was fabricated. This layer is written "DSY".

Figure 5:
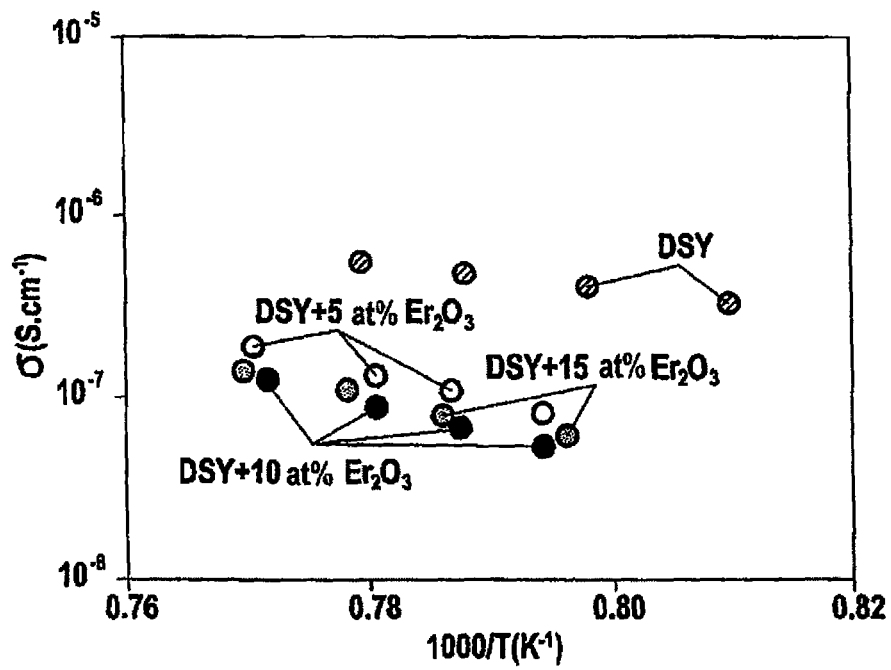
FIG. 5 shows a test result comparing the barrier effect against diffusion of oxidizing species presented by first layers suitable for use in the context of the invention and by an environmental barrier layer of the prior art.

FIG. 5 shows a test result comparing the barrier effect against oxidizing species as conferred by each of the three first layers with the barrier effect against the same species as conferred by the DSY layer. FIG. 5 shows that the conductivity to oxidizing species in each of the first layers is significantly less than the conductivity to those same species in the DSY layer. That test was performed at various temperatures lying in the range 950° C. to 1050° C. The ionic conductivity measurements were performed by complex impedance spectroscopy in ambient air in the range 950° C. to 1050° C.

Figure 6:
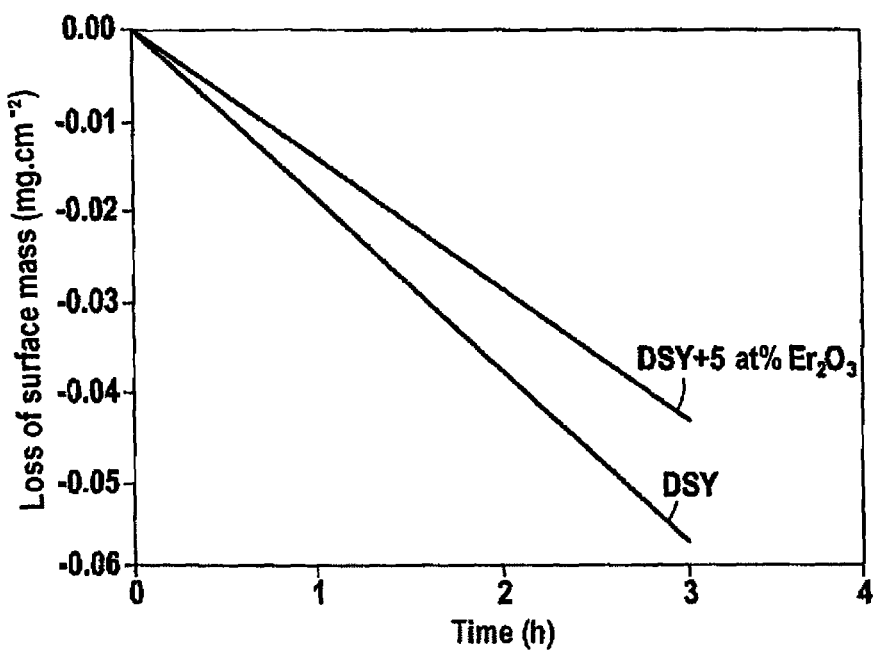
FIG. 6 shows a test result comparing the resistance to recession of a first layer suitable for use in the context of the invention and an environmental barrier layer of the prior art.

FIG. 6 shows a corrosion test result and shows that the first layer of the invention presents an ability to withstand recession that is better than the ability presented by a layer formed solely by yttrium disilicate. The recession measurements were obtained on the basis of corrosion tests performed in a corrosion oven at 1400° C. under 50 kilopascals (kPa) of $H_2O$ and 50 kPa of air with gas speeds of 5 centimeters per second (cm/s) in the cold zone of the oven.

The term "lying in the range . . . to . . . " should be understood as including the bounds.

The invention claimed is:

1. A part comprising a substrate, having, adjacent to a surface of the substrate, at least a portion that is made from a material that contains silicon, and an environmental barrier formed on the surface of the substrate, the environmental barrier comprising at least a first layer comprising:

a rare earth disilicate of formula $RE^a_2Si_2O_7$ present at a molar content lying in the range 85% to 95%, where $RE^a$ is a rare earth element, wherein $RE^a$ is selected from yttrium Y and ytterbium Yb; and at least one rare earth oxide of formula $RE^b_2O_3$ present at a molar content lying in the range 5% to 15%, where $RE^b$ is a rare earth element different from $RE^a$, wherein $RE^b$ is selected from terbium Tb, erbium Er, dysprosium Dy and lutetium Lu, wherein the environmental barrier further comprises a second layer present on the first layer, the second layer comprising at least:

one rare earth monosilicate of formula $RE^c_2SiO_5$, where $RE^c$ is a rare earth element at a molar content lying in the range 85% to 99.9%; and at least one rare earth oxide of formula $RE^d_2O_3$ present at a molar content lying in the range 0.1% to 15%, where $RE^d$ is a rare earth element different from $RE^c$.

2. A part according to claim 1, wherein $RE^d$ is selected from terbium Tb, erbium Er, dysprosium Dy, gadolinium Gd, europium Eu, lutetium Lu, samarium Sm, yttrium Y, and ytterbium Yb.

3. A part according to claim 2, wherein $RE^d$ is selected from terbium Tb, erbium Er, and dysprosium Dy.

4. A part according to claim 1, wherein the rare earth monosilicate of formula $RE^c_2SiO_5$ is present in the second layer at a molar content lying in the range 85% to 95%, and wherein said at least one rare earth oxide of formula $RE^d_2O_3$ is present in the second layer at a molar content lying in the range 5% to 15%.

5. A part according to claim 1, wherein $RE^c$ is selected from yttrium Y and ytterbium Yb.

6. A part according to claim 1, wherein $RE^a$ is yttrium Y, $RE^c$ is ytterbium Yb, and $RE^d$ is selected from terbium Tb, erbium Er, and dysprosium Dy.

7. A part according to claim 1, wherein the environmental barrier further comprises a third layer present between the first layer and the second layer, the third layer comprising:

the rare earth disilicate of formula $RE^a_2Si_2O_7$ at a molar content equal to A·Ta, where Ta is the molar content of $RE^a_2Si_2O_7$ in the first layer;

said at least one rare earth oxide of formula $RE^b_2O_3$ at a molar content equal to A·Tb, where Tb is the molar content of $RE^b_2O_3$ in the first layer; and the rare earth monosilicate of formula $RE^c_2SiO_5$ at a molar content equal to (1−A)·Tc, where Tc is the molar content of $RE^c_2SiO_5$ in the second layer;

where A designates a weighting coefficient that is strictly greater than 0 and strictly less than 1.

8. A method of fabricating a part according to claim 1, comprising forming the first layer of the environmental barrier on the surface of the substrate.

9. A method of using a part according to claim 1, comprising using said part at a temperature higher than or equal to 800° C. in a medium that is oxidizing and wet.

10. A part according to claim 7, wherein the molar content of $RE^d_2O_3$ in the second layer is less than the molar content of $RE^b_2O_3$ in the first layer.

11. A part according to claim 1, wherein $RP$ is yttrium Y.

12. A part according to claim 1, wherein the at least one rare earth oxide of formula $RE^b_2O_3$ is present at a molar content lying in the range 5% to 10%.

13. A part comprising a substrate, having, adjacent to a surface of the substrate, at least a portion that is made from a material that contains silicon, and an environmental barrier formed on the surface of the substrate, the environmental barrier comprising at least a first layer comprising:

a rare earth disilicate of formula $RE^a_2Si_2O_7$ present at a molar content lying in the range 85% to 95%, where $RP$ is a rare earth element, wherein $RE^a$ is selected from yttrium Y and ytterbium Yb; and at least one rare earth oxide of formula $RE^b_2O_3$ present at a molar content lying in the range 5% to 15%, where $RE^b$ is a rare earth element different from $RE^a$, wherein $RE^b$ is erbium Er.

14. A part according to claim 13, wherein $RE^a$ is yttrium Y.

* * * * *